United States Patent [19]

Billeriss et al.

[11] 4,378,619

[45] Apr. 5, 1983

[54] METHOD FOR ATTACHING CONNECTORS IN FOIL CAPACITORS

[75] Inventors: Walter Billeriss; Josef Hösl, both of Landshut; Werner Dresen, Obergangkofen, all of Fed. Rep. of Germany

[73] Assignee: Ernst Roederstein Spezialfabrik Für Kondensatoren GmbH, Landshut, Fed. Rep. of Germany

[21] Appl. No.: 327,167

[22] Filed: Dec. 2, 1981

Related U.S. Application Data

[63] Continuation of Ser. No. 46,903, Jun. 8, 1979, abandoned.

[30] Foreign Application Priority Data

Jun. 22, 1978 [DE] Fed. Rep. of Germany ....... 2827469

[51] Int. Cl.³ .................... H01G 13/00; H01G 1/14
[52] U.S. Cl. .................................. 29/25.42; 361/308
[58] Field of Search ............... 29/25.42; 361/307, 308, 361/306

[56] References Cited

U.S. PATENT DOCUMENTS

| 1,248,829 | 12/1917 | Dick | 29/25 R |
| 1,303,325 | 5/1919 | James | 361/307 |
| 3,806,770 | 4/1974 | Voyles | 361/308 |

FOREIGN PATENT DOCUMENTS

| 581883 | 8/1959 | Canada | 361/306 |
| 969821 | 7/1958 | Fed. Rep. of Germany | 361/307 |
| 2061505 | 10/1972 | Fed. Rep. of Germany | 361/307 |
| 1355079 | 3/1969 | France | 361/306 |
| 1016709 | 1/1966 | United Kingdom | 361/306 |

Primary Examiner—Elliot A. Goldberg
Attorney, Agent, or Firm—Toren, McGeady and Stanger

[57] ABSTRACT

A foil capacitor formed from alternating layers of metal foil and plastic foil is formed by attaching at least one metal strip having a pair of outwardly projecting bent ends which are bent so as to project toward each other and a connecting wire with a bent end is attached to said bent ends of said metal strip by soldering. The metal strip is attached by pressing the outwardly projecting end of the metal strip into the protruding plastic foil in a manner known per se.

1 Claim, 2 Drawing Figures

METHOD FOR ATTACHING CONNECTORS IN FOIL CAPACITORS

This is a continuation of application Ser. No. 046,903 filed June 8, 1979, now abandoned.

BACKGROUND OF THE INVENTION

The present invention relates generally to a method for manufacturing an electrical component and more particularly to a method for attaching connectors to the coatings of foil capacitors which consist of overlapping and alternatingly staggered coatings of metal foils and of thermoplastic plastic foils, with the plastic foils protruding beyond the metal foils. In foil capacitors of the type to which the present invention relates, a bent end of a connecting wire is always pressed into the protruding portion of the plastic foils while being heated. Subsequently, it is conductively connected by means of soldering to the assigned metal foil. The connecting wire with the bent end is always soldered by means of a soldering piece arranged at the bent end of the connecting wire to the outwardly projecting and approximately rectangularly bent end of at least one metal strip which has been inserted and welded to the corresponding metal foil of the coating and wherein the outwardly projecting end of the metal strip is pressed into the protruding plastic foils in accordance with the teachings of German Pat. No. 20 61 505.

In accordance with the method disclosed in said parent patent, for soldering the connecting wires to metal strips which protrude out of the capacitor and which have a bent end, solder is arranged at the respective end of the connecting wire and the solder is, for example, pressed into a ring which is provided at this end. Moreover, in this case, the solder as well as the bent ring are advantageously painted or sprinkled with a fluxing agent. Subsequently, the connecting wires are either successively or simultaneously heated and this may be accomplished, for example, by means of a soldering iron or it may be accomplished by means of a welding mechanism or by induction heating. During the heating or after they have been heated to an appropriate soldering temperature, the rings are subsequently pressed against a respective end of the metal strip in such a way that about one-half of each ring is in contact with the respective end of the metal strip. As soon as a connecting wire has been soldered to the respective metal strip, each connection is pressed while the respective metal strip is further bent in the heated state against the wound capacitor body to such an extent that that portion of the ring which has remained free during the soldering operation and, possibly, also a portion of the respective metal strip, will come into contact with the end or ends of the plastic foil layers which protrude at the end faces of the wound capacitor body thereby melting the plastic foils. This will have the result that the respective connection and the corresponding metal strip are rigidly embedded in the plastic material after the molten plastic has again hardened. Thus, the soldering point between the metal strip and a connection is sufficiently protected and, simultaneously, the mechanical strength of the connection is significantly increased.

Among other advantages, such a contacting method has the significant advantage that the soldering of the connecting wire to a metal strip and the embedding of a connection to a protective plastic layer may be carried out by machinery in a single working step. On the other hand, however, it is also possible that a bad soldering point may be created when the connecting wire is not centrally placed on the bent end of the metal strip. This may lead to total failure of the component or to the formation of a contact where the parts merely rest against each other. Accordingly, delayed failures of the capacitor may occur due to mechanical stress of the connecting wire or due to temperature changes.

The present invention is directed toward the task of developing a process of the type discussed above which enables secure soldering of the connecting wire to the metal strip located in the capacitor winding.

SUMMARY OF THE INVENTION

Briefly, the present invention may be described as a method for attaching connecting wires to foil capacitors which consist of alternately arranged strips of metal foil and thermoplastic plastic foil, said plastic foil protruding laterally beyond said metal foil, comprising the steps of attaching at least one U-shaped metal strip having outwardly projecting and approximately rectangularly bent ends to said metal foil, said bent ends being bent toward each other and being located in diametrically opposed relationship, and soldering a connecting wire to said bent ends of said metal strip.

In accordance with the invention, the particular advantages thereof are obtained in that the bent end of the connecting wire is soldered to two ends of at least one metal strip, and that the ends of the strip projecting outwardly from the foil capacitor are bent so as to extend toward each other.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
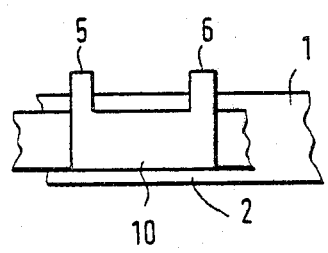
FIG. 1 is a partial plan view of a foil capacitor wherein a U-shaped metal strip is utilized for contacting the metal foil.

Referring now to the drawings, wherein similar parts are referred to with like reference numerals, there is shown schematically in FIG. 1 a plastic foil 1 and a metal foil 2 forming a layer for a wound foil capacitor. The metal foil 2 has welded thereto U-shaped metal strips 10 having free ends 5 and 6 which protrude beyond the foils 1 and 2. The metal strip 10 is mounted on the metal foil 2 preferably in such a manner that the free ends 5 and 6 are located diametrically opposed each other in the finished wound capacitor.

Figure 2:
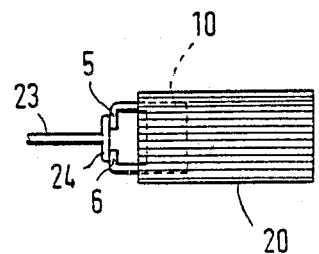
FIG. 2 shows an illustration corresponding to FIG. 1 showing the ends of the metal strip projecting out of the wound capacitor.

As shown in FIG. 2, the free ends 5 and 6 of the metal strip 10 are bent to extend toward each other so that they are arranged opposite each other. A connecting wire 23 having a bent end 24 is connected by soldering to the free ends 5 and 6 arranged in the configuration indicated.

The embodiment described and explained herein will give rise to a larger possibility that the connecting wire 23 will exactly meet the free bent ends 5 and 6 of the metal strips 3 and 4 during soldering so that safety and reliability of the soldering procedure is increased. The U-shaped metal strip 10 may be produced, for example, by a punching operation from a wide lamella or sheet of metal. The dimensions of the U-shaped metal strip 10 are, in turn, preferably selected in such a way that the free ends 5 and 6 will be located opposite each other in the wound finished capacitor 20, shown in FIG. 2 wherein the free ends 5 and 6 are bent to extend toward each other and, thus, are arranged opposite each other. Accordingly, the connecting wire 23 with its bent end 24 can be soldered to the free ends 5 and 6 in such a way that a satisfactory and reliable soldering joint may be achieved.

While specific embodiments of the invention have been shown and described in detail to illustrate the application of the inventive principles, it will be understood that the invention may be embodied otherwise without departing from such principles.

What is claimed is:

1. A method for attaching connecting wires to wound foil capacitors which consist of alternately arranged wound strips of metal foil and thermoplastic plastic foil, said plastic foil strips protruding laterally beyond said metal foil strips, comprising the steps of providing a connecting wire with a bent end, providing at least one inserted metal strip having outwardly projecting end portions, said metal strip being welded to a corresponding metal foil strip, soldering said connecting wire with said bent end by means of a soldering piece arranged at said end of said connecting wire to said outwardly projecting end portions of said at least one metal strip, and pressing said outwardly projecting end portions of said metal strip into said protruding plastic foil, wherein the improvement comprises that said metal strip being formed with a U-shaped configuration and being dimensioned in such a way that said end portions are formed as two ends arranged in said wound capacitor in diametrically opposed locations, said bent end of said connecting wire being soldered to said two ends of said U-shaped metal strip, said two ends of said U-shaped metal strip being arranged to project outwardly of said foil capacitor and being bent to extend toward each other.

* * * * *